United States Patent
Eguchi

(10) Patent No.: US 6,344,014 B1
(45) Date of Patent: Feb. 5, 2002

(54) APPARATUS FOR CONTROLLING STARTING CLUTCH OF VEHICLE HAVING FUNCTION OF STOPPING ENGINE IDLING

(75) Inventor: Takahiro Eguchi, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 14 days.

(21) Appl. No.: 09/619,767

(22) Filed: Jul. 19, 2000

(30) Foreign Application Priority Data

| Jul. 21, 1999 | (JP) | ............................................. | 11-206434 |
| Jul. 21, 1999 | (JP) | ............................................. | 11-206435 |
| Apr. 10, 2000 | (JP) | ............................................. | 12-107968 |
| Apr. 10, 2000 | (JP) | ............................................. | 12-107969 |

(51) Int. Cl.$^7$ ............................................... B60K 41/24
(52) U.S. Cl. ....................................................... 477/39
(58) Field of Search ............................ 477/39, 37, 166, 477/174, 180

(56) References Cited

U.S. PATENT DOCUMENTS

| 4,433,594 | A | * | 2/1984 | Smirl | ............................ | 475/206 |
| 5,259,272 | A | * | 11/1993 | Yamamoto et al. | ............ | 477/45 |
| 5,609,543 | A | * | 3/1997 | Aoki et al. | ...................... | 477/45 |
| 5,766,110 | A | * | 6/1998 | Kanno et al. | ................... | 477/39 |
| 5,916,061 | A | * | 6/1999 | Koyama et al. | ............. | 477/175 |

* cited by examiner

*Primary Examiner*—Charles A Marmor
*Assistant Examiner*—Ankur Parekh
(74) *Attorney, Agent, or Firm*—Armstrong, Westerman, Hattori, McLeland & Naughton, LLP.

(57) ABSTRACT

In an apparatus for controlling a starting clutch of a vehicle having a function of stopping engine idling so that an engine is automatically stopped, the starting clutch being provided in a transmission of the vehicle in series with a belt type continuously variable transmission mechanism, a load is applied to the transmission mechanism before a rise in a side pressure of the drive pulley and the driven pulley at the time of vehicle start-up from the state of engine stopping, resulting in a slipping of the belt. To avoid such a slipping, at the time of vehicle start-up from the state of engine stopping, the engaging force of the starting clutch is prevented from increasing above the creeping force which gives rise to the creeping of the vehicle until after a lapse of a predetermined time. In the course of increasing the engaging force of the starting clutch above the creeping force, the speed of rise in the engaging force of the starting clutch is limited to a relatively low speed until after the lapse of the predetermined time. The occurrence of belt slipping due to a delay in the increase in the pulley side-pressure is thus prevented.

3 Claims, 8 Drawing Sheets

APPARATUS FOR CONTROLLING STARTING CLUTCH OF VEHICLE HAVING FUNCTION OF STOPPING ENGINE IDLING

BACKGROUND OF THE INVENTION

1. Field of the Invention

The present invention relates to an apparatus for controlling a starting clutch of a vehicle having a function of stopping engine idling so that an engine is automatically stopped under given conditions when the vehicle is at a standstill, the starting clutch being provided in a transmission of the vehicle in series with a belt type continuously variable transmission mechanism.

2. Description of Related Art

In case a transmission is constituted such that a power of an engine is inputted into a belt type continuously variable transmission through a power transmission mechanism such as a forward/reverse switching mechanism or the like which has built therein hydraulically operated engaging elements, the following may happen. Namely, in a vehicle in which the engine idling is stopped when the vehicle is at a standstill, at the time of vehicle start-up from the state of engine stopping, the hydraulic oil pressure in a hydraulic circuit becomes zero while the engine is stopped and, consequently, the power transmission mechanism becomes an out-gear state (a state not fit for power transmission). Therefore, if a starting clutch is engaged earlier, the power is suddenly transmitted to driving wheels of the vehicle when the power transmission mechanism has become an in-gear state (a state of being geared in) in which the power transmission mechanism transmits power, resulting in shocks.

In order to eliminate such disadvantages, the following is considered. Namely, at the time of vehicle start-up from the state of engine stopping, the control mode of the starting clutch is switched, when the power transmission mechanism has become an in-gear state in which the power is transmitted, from a waiting mode in which the engaging force of the starting clutch is kept below a creeping force which generates the creeping of the vehicle to a running mode in which the engaging force of the starting clutch increases above the creeping force.

To a drive pulley and a driven pulley of the belt type continuously variable transmission mechanism, there is applied a pulley side-pressure by means of a cylinder which is provided on each of the pulleys. At the time of vehicle start-up from the state of engine stopping, even if the power transmission mechanism becomes the in-gear state, the cylinder will not be completely filled with hydraulic oil. As a result, the cylinder side-pressure sometimes will not rise. If the engaging force of the starting clutch increases above the creeping force before the pulley side-pressure rises, the load to be operated on the continuously variable transmission mechanism increases. Consequently, a slip occurs between the belt and the pulleys of the continuously variable transmission mechanism. Even if the pulley side-pressure has risen, it takes time for the pulley side-pressure to reach a sufficiently high pressure. During such a time, if the control mode of the starting clutch is switched to the running mode and the engaging force of the starting clutch rapidly increases, the pulley side-pressure becomes insufficient relative to the load torque to be operated on the continuously variable transmission mechanism. As a result, slipping occurs between the belt and the pulleys of the continuously variable transmission mechanism. If this kind of slipping occurs, the durability of the belt is adversely affected.

In view of the above points, the present invention has an object of providing an apparatus for controlling a starting clutch of a vehicle having a function of stopping engine idling so that an engine is automatically stopped, wherein belt slipping is prevented at the time of vehicle start-up from the state of engine stopping.

SUMMARY OF THE INVENTION

In order to attain the above and other objects, according to a first aspect of the present invention, there is provided an apparatus for controlling a starting clutch of a vehicle having a function of stopping engine idling so that an engine is automatically stopped under given conditions when the vehicle is at a standstill. The starting clutch is provided in a transmission of the vehicle in series with a belt type continuously variable transmission mechanism. The apparatus comprises: engagement preventing means for preventing an engaging force of the starting clutch from increasing above a creeping force which gives rise to creeping of the vehicle, the preventing being made at a time of vehicle start-up from the state of engine stopping until after a lapse of a predetermined time.

According to a second aspect of the present invention, there is provided an apparatus for controlling a starting clutch of a vehicle having a function of stopping engine idling so that an engine is automatically stopped under given conditions when the vehicle is at a standstill. The starting clutch is provided in a transmission of the vehicle in series with a belt type continuously variable transmission mechanism. The apparatus comprises: increase limiting means for limiting a speed of increase in an engaging force of the starting clutch. The limiting is made, until after a lapse of a predetermined time in a step in which the engaging force is increased above a creeping force which gives rise to creeping of the vehicle at a time of vehicle start-up from a state of engine stopping, by keeping an upper limit value of the speed of increase in the engaging force below a value after the lapse of the predetermined time.

According to a third aspect of the present invention, there is provided an apparatus for controlling a starting clutch of a vehicle having a function of stopping engine idling so that an engine is automatically stopped under given conditions when the vehicle is at a standstill. The starting clutch is provided in a transmission of the vehicle in series with a belt type continuously variable transmission mechanism which receives an input of a power from the engine through power transmission mechanism having built therein hydraulically operated frictional engaging elements, wherein, at a time of vehicle start-up from a state of engine stopping, a control mode of the starting clutch is switched from a waiting mode in which an engaging force of the starting clutch is kept below a creeping force which gives rise to creeping of the vehicle to a running mode in which the engaging force of the starting clutch is increased above the creeping force. The switching is made at a time when the power transmission mechanism has become an in-gear state in which the power is transmitted. The apparatus comprises increase limiting means for limiting a speed of increase in the engaging force. The limiting is made, until after a lapse of a predetermined time from a point of time of switching to the running mode, by keeping an upper limit value of the speed of increase in the engaging force below a value after the lapse of the predetermined time.

In the above-described first aspect of the present invention, if the above-described predetermined time is set to a time which is required for the pulley side-pressure of the drive pulley and the driven pulley of the continuously variable transmission mechanism to rise, the engaging force of the starting clutch will not increase above the creeping force before the pulley side-pressure rises. In this manner, the slipping in the belt of the continuously variable transmission mechanism can be prevented.

According to the above-described second and third aspects of the present invention, in the course in which the control mode of the starting clutch is switched to the running mode and in which the engaging force of the starting clutch is increased above the creeping force, the engaging force of the starting clutch is initially slowly increased. By setting the above-described predetermined time depending on the delay in the response to the increase in the pulley side-pressure, the slipping of the belt can be prevented.

In the embodiment to be described hereinafter, what corresponds to the predetermined time in the first aspect of the present invention is YTM2. What corresponds to the above-described engagement preventing means is the processing at steps S4-25 and S4-33 in FIG. 4. What corresponds to the above-described predetermined time in the above-described second and third aspects of the present invention is YTM4. The values of the upper limit value of the speed of increase after and before the lapse of the predetermined time are, respectively, YΔPLMTN and YΔPLMTS. What corresponds to the above-described increase limiting means is the processing at steps S25, S27, S28, S29 and S33 in FIG. 3.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
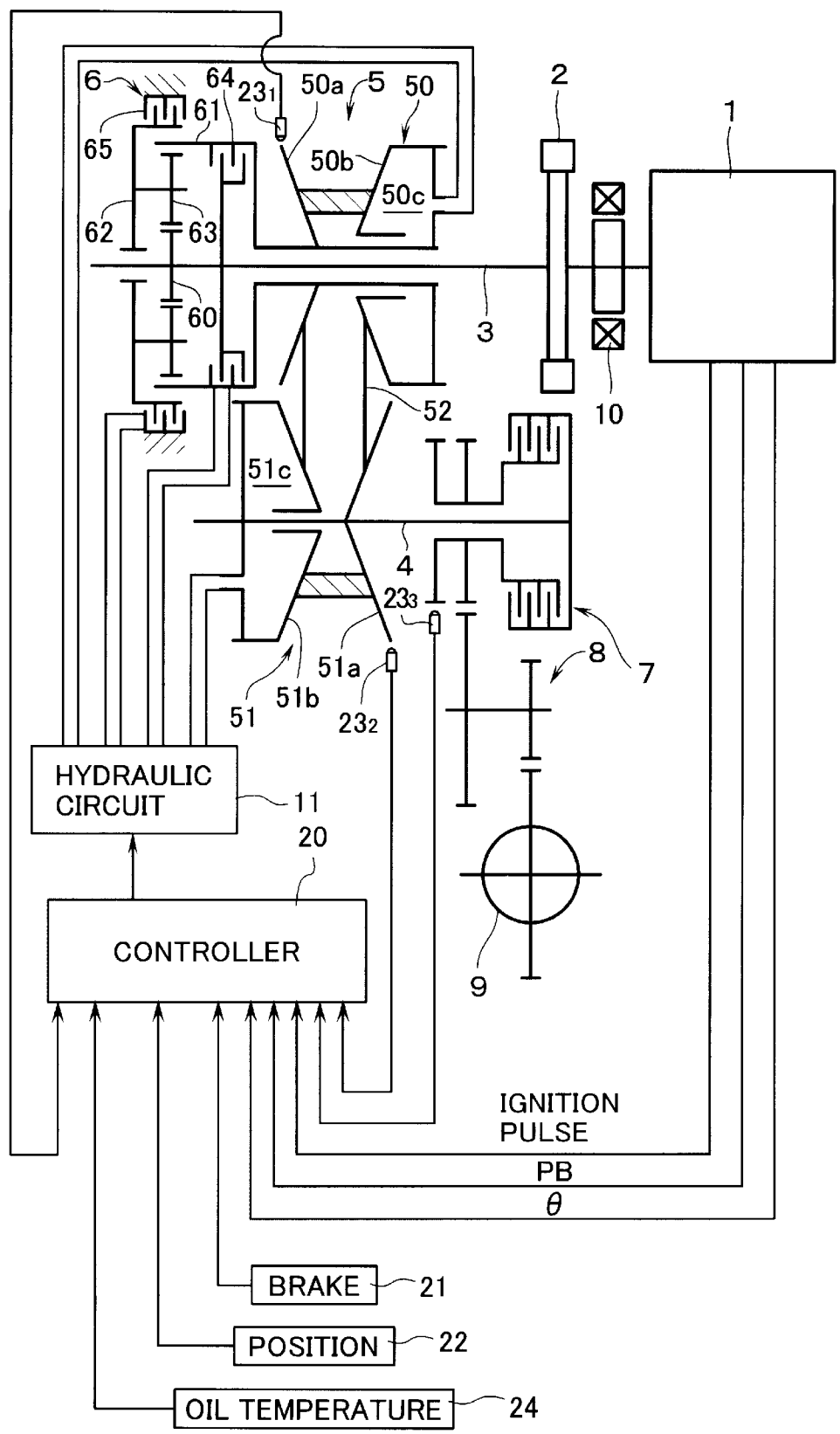
FIG. 1 is a skeleton diagram showing one example of a transmission which is provided with a starting clutch to be controlled by the apparatus of the present invention.

FIG. 1 shows a transmission of a vehicle such as a motor vehicle. This transmission is made up of: a belt-type continuously (or steplessly) variable transmission mechanism 5 which is disposed between an output shaft 4 and an input shaft 3 to be connected to an engine 1 through a coupling mechanism 2; a switching mechanism 6 which switches between forward running and reverse running (hereinafter called forward/reverse switching mechanism 6) and which serves as a power transmission mechanism disposed on an input side of the continuously variable transmission mechanism 5; and a starting clutch 7 which is made up of a hydraulic clutch disposed on an output side of the continuously variable transmission mechanism 5.

The continuously variable transmission mechanism 5 is made up of: a drive pulley 50 which is rotatably supported on the input shaft 3; a driven pulley 51 which is connected to the output shaft 4 so as not to rotate relative to the output shaft 4; and a metallic V-belt 52 which is wound around both the pulleys 50, 51. Each of the pulleys 50, 51 is made up of: a fixed flange 50a, 51a; a movable flange 50b, 51b which is axially movable relative to the fixed flange 50a, 51a; and a cylinder 50c, 51c which urges or pushes the movable flange 50b, 51b toward the fixed flange 50a, 51a. By adequately controlling the pressure of hydraulic oil to be supplied to the cylinder 50c, 51c of each of the pulleys 50, 51, there is generated an adequate pulley side-pressure which does not give rise to the slipping of the V-belt 52. Also, by varying the pulley width of both the pulleys 50, 51, the diameter of winding the V-belt 52 on the pulleys 50, 51 is varied, whereby continuously variable speed changing is provided.

The forward/reverse switching mechanism 6 is constituted by a planetary gear mechanism which is made up of: a sun gear 60 which is connected to the input shaft 3; a ring gear 61 which is connected to the drive pulley 50; a carrier 62 which is rotatably supported by the input shaft 1; a planetary gear 63 which is rotatably supported by the carrier 62 and which is meshed with the sun gear 60 and the ring gear 61; a forward running clutch 64 which serves as a hydraulically operated friction element capable of connecting the input shaft 3 and the ring gear 61; and a reverse running brake 65 which serves as hydraulically operated friction element capable of fixing the carrier 62. When the forward running clutch 64 is engaged, the ring gear 61 rotates together with the input shaft 3, and the drive pulley 50 is rotated in the same direction as the input shaft 3 (i.e., forward running direction). When the reverse running brake 65 is engaged, on the other hand, the ring gear 61 is rotated in a direction opposite to that of the sun gear 60, and the drive pulley 50 is driven in a direction opposite to that of the input shaft 3 (i.e., in the reverse running direction). When both the forward running clutch 64 and the reverse running brake 65 are released, the power transmission through the forward/reverse switching mechanism 6 is interrupted.

The starting clutch 7 is connected to the output shaft 4. When the starting clutch 7 is engaged, the output of the engine whose speed has been changed by the continuously variable transmission mechanism 5 is transmitted to a differential 9 through gear trains 8 on the output side of the starting clutch 7, whereby the driving force is transmitted to the left and right driving wheels (not illustrated) of the vehicle from the differential 9. When the starting clutch 7 is released, the power transmission does not take place, and the transmission becomes a neutral state.

In addition, an electric motor 10 is directly connected to the engine 1. The electric motor 10 performs power assisting at the time of acceleration, or the like, recovering of energy at the time of deceleration, and starting of the engine 1. While the vehicle is at a standstill, the engine 1 is automatically stopped if some given conditions are satisfied, e.g.: that the brake is on; that an air conditioner is switched off; and a brake booster negative pressure is above a predetermined value; or the like. If the brake is subsequently off, the engine 1 is started by the electric motor 10, whereby the vehicle is started up from the state of the engine stopping.

Figure 2:
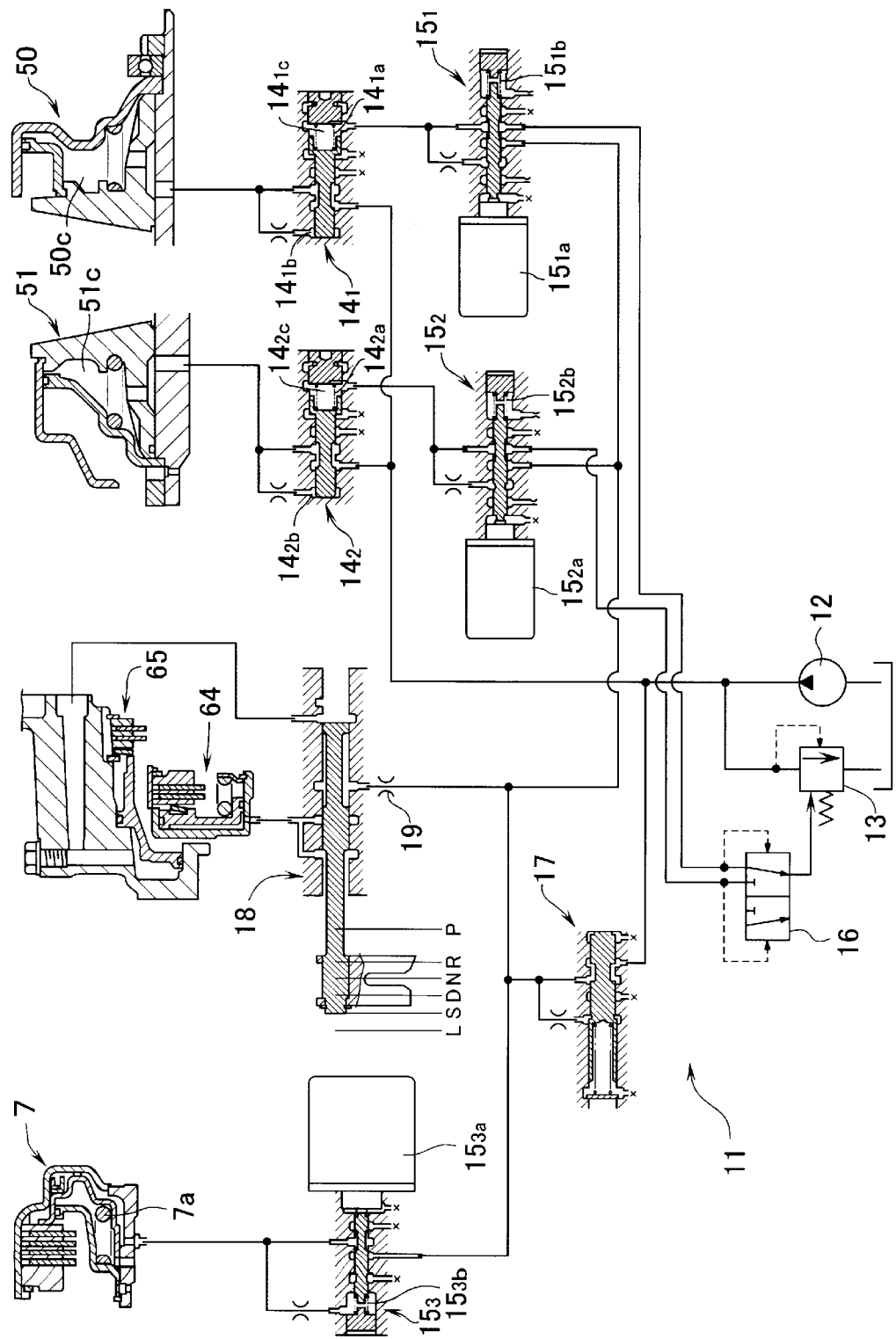
FIG. 2 is a diagram showing a hydraulic circuit of the transmission in FIG. 1.

The hydraulic oil pressures in the cylinder $50c$, $51c$ of each of the pulleys 50, 51 of the continuously variable transmission mechanism 5, in the forward running clutch 64, in the reverse running brake 65 and in the starting clutch 7 are controlled by a hydraulic circuit 11. As shown in FIG. 2, the hydraulic circuit 11 is provided with a hydraulic oil pump 12 which is driven by the engine 1. The delivery pressure from this hydraulic oil pump 12 is regulated by a regulator 13 to a predetermined line pressure. The hydraulic oil pressures (pulley side-pressure) in each of the cylinders $50c$, $51c$ of the drive pulley 50 and the driven pulley 51 can be regulated by each of the first and second pressure regulating valves $14_1$, $14_2$ with the line pressure serving as a base pressure. Each of the first and second pressure regulating valves $14_1$, $14_2$ is urged by a spring $14_{1a}$, $14_{2a}$ toward the leftward open position, and is urged by the pulley side-pressure to be inputted into a left end oil chamber $14_{1b}$, $14_{2b}$ toward the rightward closed position. Further, there are provided a first linear solenoid valve $15_1$ for the first pressure regulating valve $14_1$ and a second linear solenoid valve $15_2$ for the second pressure regulating valve $14_2$. An output pressure from each of the first and second linear solenoid valves $15_1$, $15_2$ is inputted into a right end oil chamber $14_{1c}$, $14_{2c}$ of each of the pressure regulating valves $14_1$, $14_2$. In this manner, it is arranged that each of the pulley side-pressures in the drive pulley 50 and the driven pulley 51 can be controlled by each of the first and second linear solenoid valves $15_1$, $15_2$. The output pressure which is the higher pressure between the output pressures of the first and second linear solenoid valves $15_1$, $15_2$ is inputted into the regulator 13 through a changeover valve 16. By controlling the line pressure by this output pressure, an appropriate pulley side-pressure which does not give rise to slipping of the belt 52 is generated. Each of the first and second linear solenoid valves $15_1$, $15_2$ is urged toward the leftward open position by a spring $15_{1b}$, $15_{2b}$ and is also urged toward the rightward closed position by its own output pressure and an electromagnetic force of a solenoid $15_{1a}$, $15_{2a}$. With a modulator pressure (a pressure which is lower than the line pressure by a certain value) from a modulator valve 17 serving as a basic pressure, a hydraulic oil pressure in inverse proportion to the value of an electric current charged to the solenoid $15_{1a}$, $15_{2a}$ is outputted.

To the starting clutch 7, there is connected an oil passage which supplies the modulator pressure, and a third linear solenoid valve $15_3$ is interposed in this oil passage. The third linear solenoid valve $15_3$ is urged toward the rightward closed position by a spring $15_{3b}$ and the hydraulic oil pressure of the starting clutch and is also urged toward the leftward open position by an electromagnetic force of the solenoid $15_{3a}$. In this manner, the engaging force of the starting clutch 7, i.e., the hydraulic oil pressure of the starting clutch 7 varies in proportion to the value of the electric current charged to the solenoid $15_{3a}$ with the modulator pressure as the basic pressure.

It is so arranged that the modulator pressure is inputted into the forward running clutch 64 and the reverse running brake 65 through the manual valve 18. The manual valve 18 can be switched into the following five positions in a manner interlocked with a selector lever (not illustrated): i.e., "P" position for parking; "R" position for reverse running; "N" position for neutral state; "D" position for ordinary running; "S" position for sporty running; and "L" position for low-speed holding. In each of the "D", "S" and "L" positions, the modulator pressure is supplied to the forward running clutch 64. In the "R" position, the modulator pressure is supplied to the reverse running brake 65. In each of the "N" and "P" positions, the supply of the modulator pressure to both the forward running clutch 64 and the reverse running brake 65 is stopped. To the manual valve 18, the modulator pressure is supplied through an orifice 19.

Each of the first through third linear solenoid valves $15_1$, $15_2$, $15_3$ is controlled by a controller 20 (see FIG. 1) which is made up of an onboard (a vehicle-mounted) computer. The controller 20 receives the inputs of the following: i.e., the ignition pulses of the engine 1, signals indicating the negative suction pressure PB of the engine 1, and the throttle opening degree θ; a signal from a brake switch 21 which detects the degree or amount of depression of a brake pedal; a signal from a position sensor 22 which detects a selected position of the selector lever; a signal from a speed sensor $23_1$ which detects a rotational speed, or a rotational frequency, of the drive pulley 50; a signal from a speed sensor $23_2$ which detects the rotational speed of the driven pulley 51; a signal from a speed sensor $23_3$ which detects the rotational speed on the output side of the starting clutch 7, i.e., the vehicle speed; and a signal from an oil temperature sensor 24 which detects the temperature of an oil in the transmission. Based on these signals, the controller 20 controls the first through third linear solenoid valves $15_1$, $15_2$, $15_3$.

If the engine 1 is stopped when the vehicle is at a standstill, the hydraulic oil pump 12 which serves as a hydraulic oil pressure source for the hydraulic circuit 11 is also stopped, whereby the hydraulic oil is drained from the hydraulic circuit 11. As a result, at the time of vehicle start-up from the state of the engine stopping, it takes time to reach an in-gear state (or a state of being geared in) in which the forward running clutch 64 or the reverse running brake 65 is engaged so that the forward/reverse switching mechanism 6 can transmit the power. If the starting clutch 7 has already been engaged before the in-gear state is attained, the power will be suddenly transmitted to the driving wheels of the vehicle as a result of gearing in of the forward/reverse switching mechanism 6, whereby shocks occur. Therefore, it is desirable to switch a control mode of the starting clutch 7, at the time when the forward/reverse switching mechanism 6 has just attained the in-gear state, from a waiting mode in which an ineffective stroke of the starting clutch 7 is eliminated or minimized to a running mode in which the engaging force of the starting clutch 7 is increased. In addition, in order to improve the starting response, it is desirable, in the waiting mode, to increase the hydraulic oil pressure in the starting clutch 7 to, and hold it at, a creeping pressure (a hydraulic oil pressure at which slipping of the starting clutch 7 does occur but at which a torque above an inertia of the vehicle can be transmitted). However, if that command value PSCCMD of the hydraulic oil pressure in the starting clutch 7 which is to be controlled by the third linear solenoid valve $15_3$ is changed to the creeping pressure from the beginning of the vehicle start-up, the following will happen. Namely, since no hydraulic oil pressure is available in the hydraulic circuit 11 at the beginning of the vehicle start-up, the third linear solenoid valve $15_3$ will be fully opened without receiving the hydraulic oil pressure which urges it toward the closed position. As a result, when the hydraulic oil pressure rises, the hydraulic oil pressure in the starting clutch 7 will overshoot to a value exceeding the creeping pressure, resulting in the occurrence of shocks. On the other hand, if the hydraulic oil pressure in the starting clutch 7 increases to the creeping pressure while the pulley side-pressure has not risen yet, a load corresponding to the inertia of the vehicle will operate or work on the driven pulley 51 through the starting clutch 7. As a result, the belt 52 will slip due to an insufficient belt side-pressure.

Figure 3:
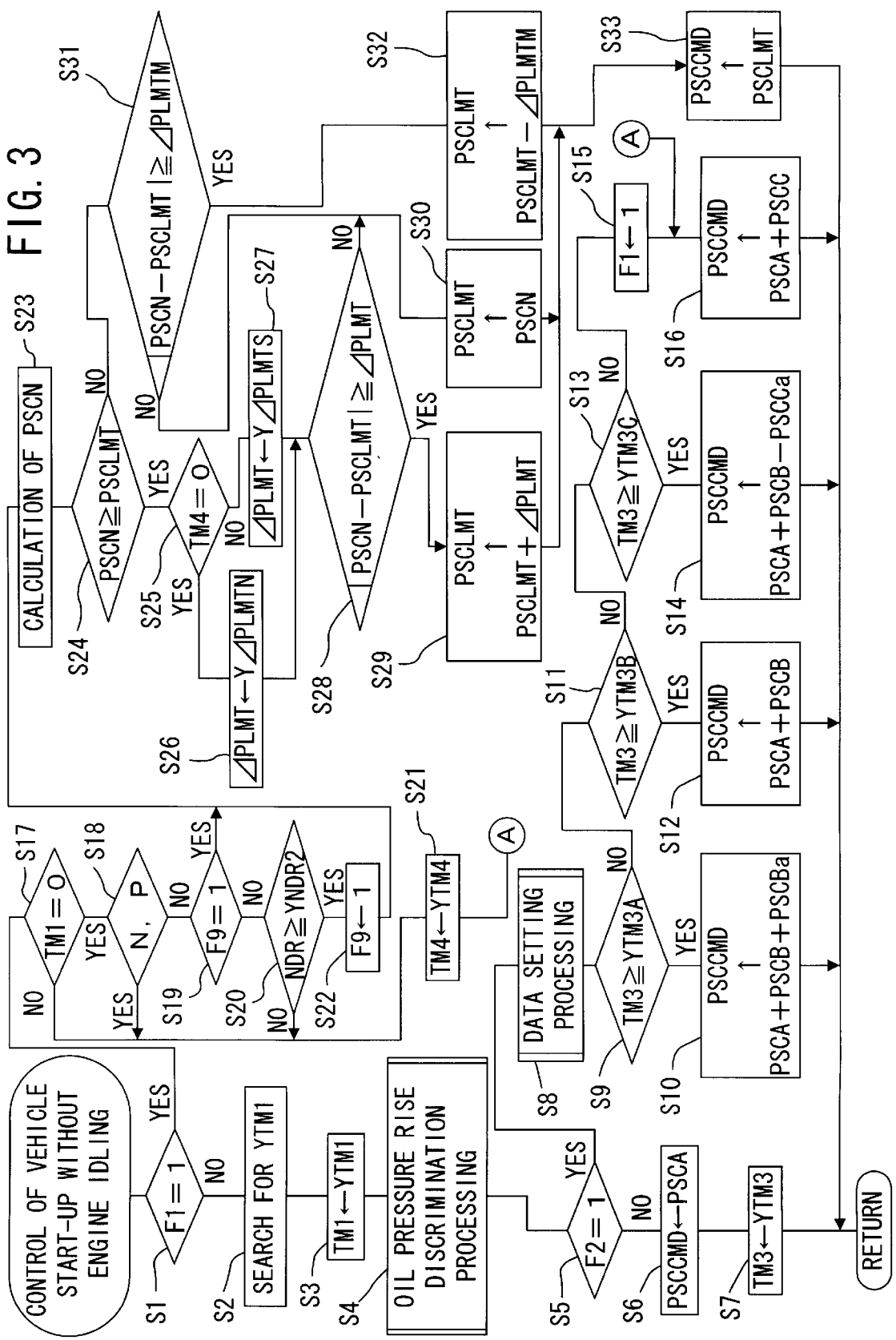
FIG. 3 is a flow chart showing a program for controlling the starting clutch at the time of vehicle start-up from the state of engine stopping.
Figure 6:
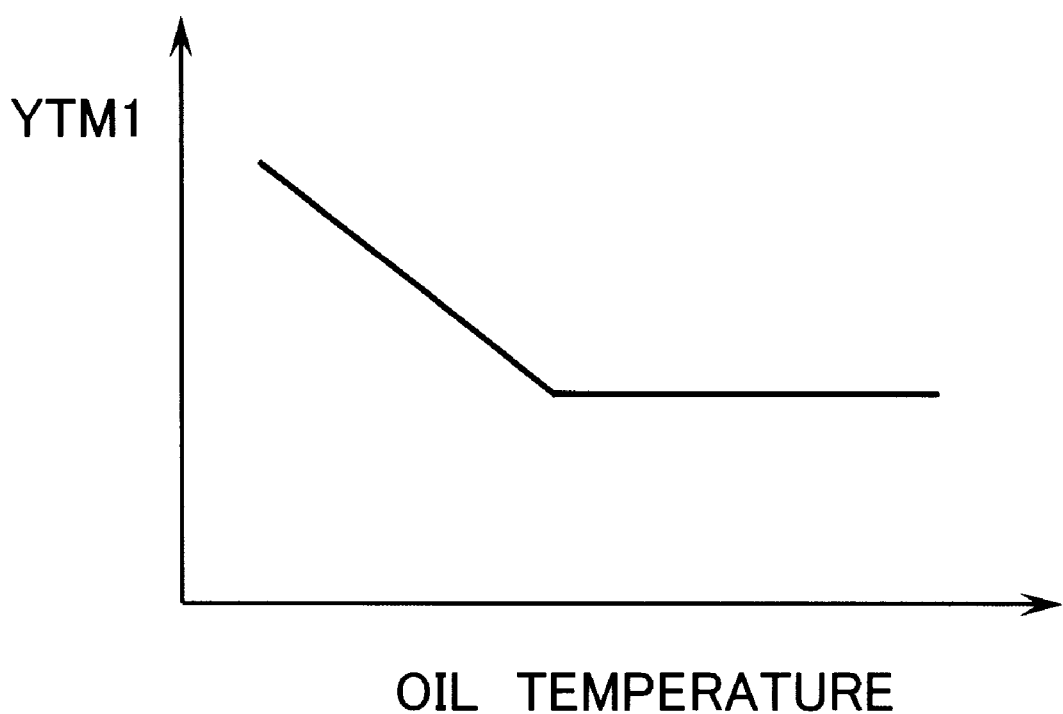
FIG. 6 is a graph showing a data table of YTM1 which is used in the searching at step S2 of the control program in FIG. 3.

In view of the above points, at the time of the vehicle start-up from the state of engine stopping, the starting clutch 7 is controlled by the program shown in FIG. 3. This control is performed at a predetermined time interval, e.g., at a time interval of 10 msec. First, at step S1, a discrimination is made as to whether a flag F1 has been set to "1" or not. Since the flag F1 has initially been reset to "0", a determination of "NO" is made at step S1. The program then proceeds to step S2, where a timer value YTM1 is searched. Considering the delay in response to the increase or boosting in the hydraulic oil pressure, the timer value YTM1 is set, as shown in FIG. 6, such that the lower the oil temperature becomes, the longer the timer value becomes. The value of YTM1 depending on the present oil temperature is searched in the data table of YTM1 which is prepared with the hydraulic oil temperature as a parameter. When the oil temperature is above the ambient temperature, the value YTM1 is set to about 50 msec. Then, after setting at step S3 the remaining time TM1 of a subtraction type of first timer to YTM1, the program proceeds to step S4 to perform the processing of discriminating the rise in the hydraulic oil pressure.

Figure 4:
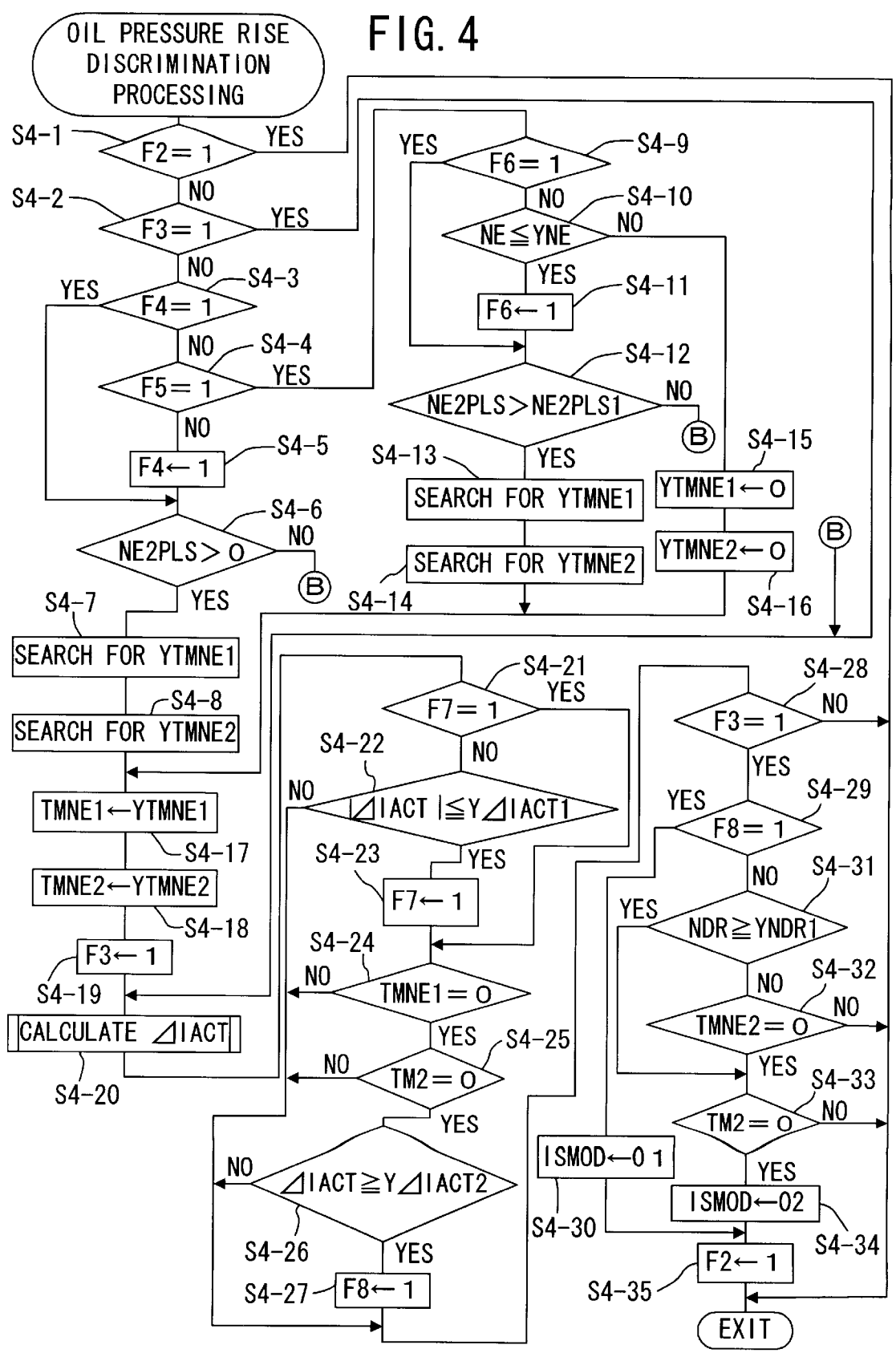
FIG. 4 is a flow chart showing the content of processing at step S4 of the control program in FIG. 3.

Details of the processing of discriminating the rise in the hydraulic oil pressure are shown in FIG. 4. At steps S4-1, S4-2, S4-3, a discrimination is made respectively as to whether a flag F2, F3, F4 has been set to "1" or not. Since the flag F2, F3, F4 has initially been reset to "0", the program proceeds to step S4-4 to discriminate as to whether a flag F5 has been set to "1" or not. The flag F5 is a flag to be prepared in a sub-routine work and is set to "1" if even only one of the ignition pulses is inputted within a predetermined time (e.g., 500 msec). If there is no input at all of the ignition pulses, i.e., when the engine 1 can be judged to be completely stopped, the flag F5 is reset to "0." If F5=0, the flag F4 is set to "1" at step S4-5, and the program proceeds to step S4-6. From the next time, the program proceeds from step S4-3 directly to step S4-6.

Figure 7A:
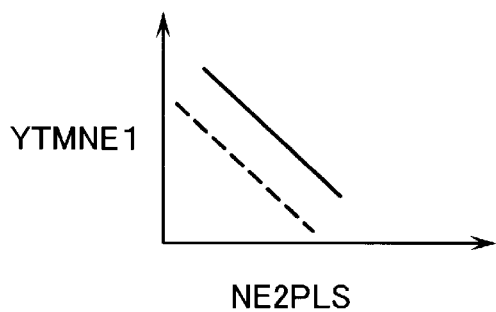
FIG. 7A is a graph showing a data table of YTMNE1 which is used in the searching at step S4-7 in FIG. 4.
Figure 7B:
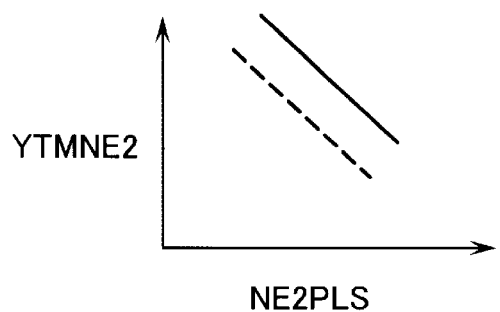
FIG. 7B is a graph showing a data table of YTMNE2 which is used in the searching at step S4-8 in FIG. 4.
Figure 7C:
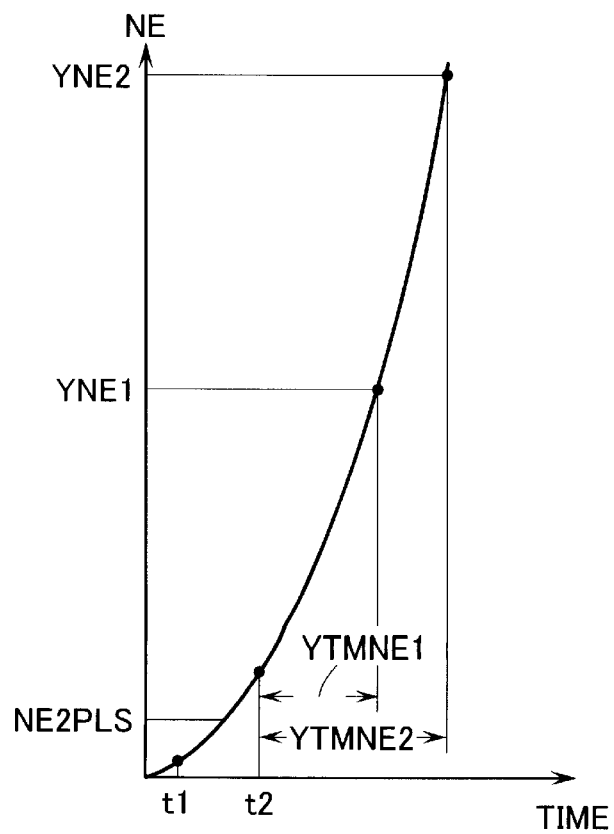
FIG. 7C is a graph showing the principle of estimating the rotational speed of the engine by means of YTMNE1 and YTMNE2.

At step S4-6, a discrimination is made as to whether that rotational speed NE2PLS of the engine 1 which is calculated by the difference between the times of inputting two consecutive ignition pulses is larger than zero. The computation of NE2PSL is performed in a sub-routine work. It is when NE2PSL calculated by the difference between the time of inputting a first ignition pulse and the time of inputting a second ignition pulse, which are inputted after the engine stopping, becomes larger than zero that a determination of "YES" is made at step S4-6. Then, if a determination of "YES" is made at step S4-6, the program proceeds to step S4-7, where a timer value YTMNE1 which obtains or finds out the point of time at which the rotational speed NE of the engine 1 increases to a first predetermined speed YNE1 (e.g., 500 rpm) is searched. Then, the program proceeds to step S4-8, where a timer value YTMNE2 which obtains the point of time at which the rotational speed NE of the engine 1 increases to a second predetermined speed YNE2 (e.g., 900 rpm) is searched. As shown in FIGS. 7A and 7B, the values YTMNE1 and YTMNE2 are set such that the larger NE2PLS becomes, the shorter YTMNE1 and YTMNE2 become. With reference to FIG. 7C, reference character t1 denotes a point of time at which the first ignition pulse is inputted, and reference character t2 denotes a point of time at which the second ignition pulse is inputted. The rotational speed NE2PLS that is calculated from the difference in times of inputting both ignition pulses becomes considerably smaller than the actual rotational speed NE of the engine 1 at that point of time. However, the time required for the rotational speed NE of the engine 1 to increase from the point of time t2 to each of the predetermined speeds YNE1, YNE2 can be obtained from NE2PLS at a considerably high accuracy. Based on this principle, YTMNE1 and YTMNE2 are set.

In case the vehicle start-up takes place before complete stopping of the engine 1, since the state of F5=1 has been established, the program proceeds from step S4-4 to step S4-9, where a discrimination is made as to whether the flag F6 has been set to "1" or not. Since the flag F6 has initially been reset to "0", a determination of "NO" is made at step S4-9. The program then proceeds to step S4-10, where a discrimination is made as to whether the rotational speed NE of the engine 1 obtained as an average value of a plurality of NE2PLS's is below a predetermined speed YNE (e.g., 500 rpm) or not. If a condition of NE≦YNE is satisfied, the flag F6 is set to "1" at step S4-11 and the program then proceeds to step S4-12. From the next time, the program proceeds from step S4-9 directly to step S4-12, where a discrimination is made as to whether the value of NE2PLS at this time has become larger than the value NE2PLS1 at the previous time. It is when NE2PLS has changed for an increase for the first time after the vehicle start-up that a determination of "YES" is made at step S4-12. Then, if a determination of "YES" is made at step S4-12, a searching for YTMNE1 and YTMNE2 is made at steps S4-13 and S4-14 with NE2PLS at this time serving as a parameter. YTMNE1 and YTMNE2 to be searched at steps S4-13 and S4-14 are set, as shown in dotted lines in FIGS. 7A and 7B, to become shorter than YTMNE1 and YTMNE2, as shown in solid lines, which are to be searched at steps S4-7 and S4-8.

When a determination of "NO" is made at step S4-10, YTMNE1 and YTMNE2 are made to zero at steps S4-15 and S4-16. Once the searching for YTMNE1 and YTMNE2 is finished as noted above, the remaining times TMNE1 and TMNE2 of substraction type of first and second timers for discrimination of NE are set at steps S4-17 and S4-18 to YTMNE1 and YTMNE2, respectively. Then, at step S4-19, the flag F3 is set to "1", and the program proceeds to step S4-20. From the next time, the program proceeds from step S4-2 directly to step S4-20.

At step S4-20, an amount of change ΔIACT of an effective value IACT of electric current charged to the solenoid $15_{3a}$ of the third linear solenoid valve $15_3$ is calculated. ΔIACT is calculated as a difference between a detected value of IACT at this time and an average value, e.g., of IACT detected three times before through IACT detected five times before. Once ΔIACT has been calculated, a discrimination is then made at step S4-21 as to whether the flag F7 has been set to "1" or not. Since F7 has initially been reset to "0", the program therefore proceeds to step S4-22, where a discrimination is made as to whether an absolute value of ΔIACT has become smaller than a predetermined value YΔIACT1 (e.g., 3.1 mA) or not. At the time of vehicle start-up from the state of engine stopping, when the hydraulic oil pressure command value PSCCMD rises from zero, the electric charging to the solenoid $15_{3a}$, is started. And a feedback control of IACT is made so that IACT becomes a target electric current value which corresponds to PSCCMD. Therefore, until IACT becomes stable at the target electric current value, the state will be |ΔIACT|>YΔIACT1. Then, when a condition of |ΔIACT|≦YΔIACT1 has been satisfied, i.e., when IACT has been discriminated to be stable at the target electric current value, the flag F7 is set to "1" at step S4-23. The program, then, proceeds to step S4-24. From the next time, the program proceeds from step S4-21 directly to step S4-24.

At step S4-24, a discrimination is made as to whether the remaining time TMNE1 of the first timer for discriminating NE has become zero or not, i.e., as to whether the rotational speed NE of the engine 1 has increased to the first predetermined speed YNE1 or not (see FIG. 7C). If the result of this discrimination is "YES", a discrimination is made at step S4-25 as to whether the remaining time TM2 of a subtraction type of second timer has become zero or not. TM2 has initially been set to YTM2 at the beginning of vehicle start-up from the state of engine stopping. Then, if a condition of TM2=0 is satisfied after a lapse of time of YTM2 from the point of time of the vehicle start-up, a discrimination is made at step S4-26 as to whether ΔIACT has exceeded a predetermined value YΔIACT2 (e.g., 12.4 mA) or not.

If the vehicle start-up takes place from the state in which there is no hydraulic oil pressure in the hydraulic circuit 11 due to stopping of the engine, when the hydraulic oil pressure in the hydraulic circuit 11 has risen, the fully opened third linear solenoid valve $15_3$ is returned toward the closed position. Counter-electromotive force will thus occur to the solenoid $15_{3a}$, and IACT increases by the amount corresponding to the counter-electromotive force. Therefore, a determination can be made as to whether the hydraulic oil pressure in the hydraulic circuit 11 has rise n or not by whether a condition of ΔIACT≧YΔIACT2 has been satisfied or not. There are sometimes cases where the condition of ΔIACT≧YΔIACT2 is not satisfied by the occurrence of a counter-electromotive force due to the changes in the hydraulic oil pressure at the transient period of the rise in the hydraulic oil pressure. Therefore, in order to prevent a wrong discrimination of the rise in the hydraulic oil pressure, in this embodiment, the following arrangement has been employed. Namely, step S4-24 is provided and, until a condition of TMNE1=0 is satisfied, i.e., until the rotational speed NE of the engine 1 increases to the first predetermined speed YNE1, the discrimination at step S4-26, i.e., the discrimination regarding the rise in the hydraulic oil pressure based on AIACT is not performed. The reason why step S4-25 is provided will be given in detail hereinafter.

When a condition of ΔIACT≧ΔIACT2 has been satisfied, the flag F8 is set to "1" at step S4-27, and then a discrimination is made at step S4-28 as to whether the flag F3 has been set to "1" or not. If a condition of F3=1 has been satisfied as a result of the setting processing at step S4-19, a discrimination is made at step S4-29 as to whether the flag F8 has been set to "1" or not. If a condition of F8=1 has been satisfied as a result of setting processing at step S4-27, a mode value ISMOD is set to "01" at step S4-30.

If the flag F8 has not been set to "1", a discrimination is made at step S4-31 as to whether the rotational speed NDR of the drive pulley 50 has already exceeded a predetermined first speed YNDR1 (e.g., 500 rpm) or not. If a condition is NDR<YNDR1, a discrimination is made at step S4-32 as to whether the remaining time TMNE2 of the second timer for discriminating the NE has become zero or not, i.e., as to whether the rotational speed NE of the engine 1 has increased to the second predetermined speed YNE2 or not (see FIG. 7C). When a condition of NDR≧YNDR1 or TMNE2=0 has been satisfied, a discrimination is made at step S4-33 as to whether TM2=0 or not. When TM2=0, a mode value ISMOD is set to "02" at step S4-34. Once the setting processing has been performed at step S4-30 or step S4-34, the flag F2 is set to "1" at step S4-35, and the subsequent processing of discriminating the rise in the hydraulic oil pressure is stopped.

When the vehicle start-up takes place from the state in which there is no hydraulic oil pressure in the hydraulic circuit 11, the rise in the hydraulic oil pressure can be discriminated based on ΔIACT as explained hereinabove, i.e., based on the counter-electromotive force of the solenoid $15_{3a}$ of the third linear solenoid valve $15_3$. On the other hand, if the vehicle start-up takes place in a state in which a residual pressure is present in the hydraulic circuit 11, the third linear solenoid valve $15_3$ will not be fully opened. The rise in the hydraulic oil pressure cannot therefore be discriminated based on the counter-electromotive force of the solenoid $15_{3a}$. When the hydraulic oil begins to be supplied to the forward running clutch 64 or to the reverse running brake 65 as a result of the start of the engine 1, the drive pulley 50 starts to rotate by the power transmission through the forward/reverse switching mechanism 6. Therefore, when the rotational speed NDR of the drive pulley 50 has increased to YNDR1, the hydraulic oil pressure of the hydraulic circuit 11 can also be judged to have risen. Therefore, in this embodiment, a discrimination is made at step S4-31 as to whether the hydraulic oil pressure has risen or not based on the rotational speed NDR of the drive pulley 50. If there is a delay in the rise in the hydraulic oil pressure in the forward running clutch 64 or the reverse running brake 65, or if the range of the transmission has been switched to the non-running range of "N" or "P" position, a condition of NDR≧YNDR1 is sometimes not satisfied even though the hydraulic oil pressure has already risen. As a solution, in this embodiment, there is provided a step of S4-32 to discriminate as to whether the hydraulic oil pressure has risen or not also based on the rotational speed NE of the engine 1.

With reference to FIG. 3, when the processing of discriminating the rise in the hydraulic oil pressure has been made at step S4, a discrimination is then made at step S5 as to whether the flag F2 has been set to "1" or not. Until a condition of F2=1 is satisfied, i.e., until the hydraulic oil pressure in the hydraulic circuit 11 has risen, the program proceeds to step S6 to thereby set the hydraulic oil pressure command value PSCCMD to an initial pressure PSCA which is lower than the creeping pressure. Further, at step S7, the remaining time TM3 in a subtraction type of third timer is set to a predetermined time YTM3 (e.g., 500 msec). The initial pressure PSCA is set to a value substantially equal to a set load of a return spring 7a of the starting clutch 7. Even if the hydraulic oil pressure to the starting clutch 7 increases to the initial pressure PSCA, the starting clutch 7 only attains a state in which a non-effective stroke is eliminated down to the smallest extent possible and, thus, an engaging force will not occur. Therefore, even if the hydraulic oil pressure in the starting clutch 7 overshoots due to the rise in the hydraulic oil pressure in the hydraulic circuit 11, the starting clutch 7 will not be strongly engaged. Shocks will consequently not occur.

The above-described YTM2 is set to such a time as, for example, 200 msec considering the time required for the pulley side-pressure to rise by the oil supply to the cylinder 50c, 51c of the drive pulley 50 or the driven pulley 51c. Further, due to the processing at steps S4-25 and S4-33, the setting to "1" of the flag F2 is prohibited until a lapse of time of YTM2 from the point of time of the vehicle start-up. The hydraulic oil pressure command value PSCCMD is thus held at the initial pressure PSCA, and the engaging force of the starting clutch 7 is prevented from increasing above the creeping force at which the creeping of the vehicle occurs. In this manner, by the engaging of the starting clutch 7 before the rise in the pulley side-pressure, the belt 52 can be prevented from slipping.

Figure 5:
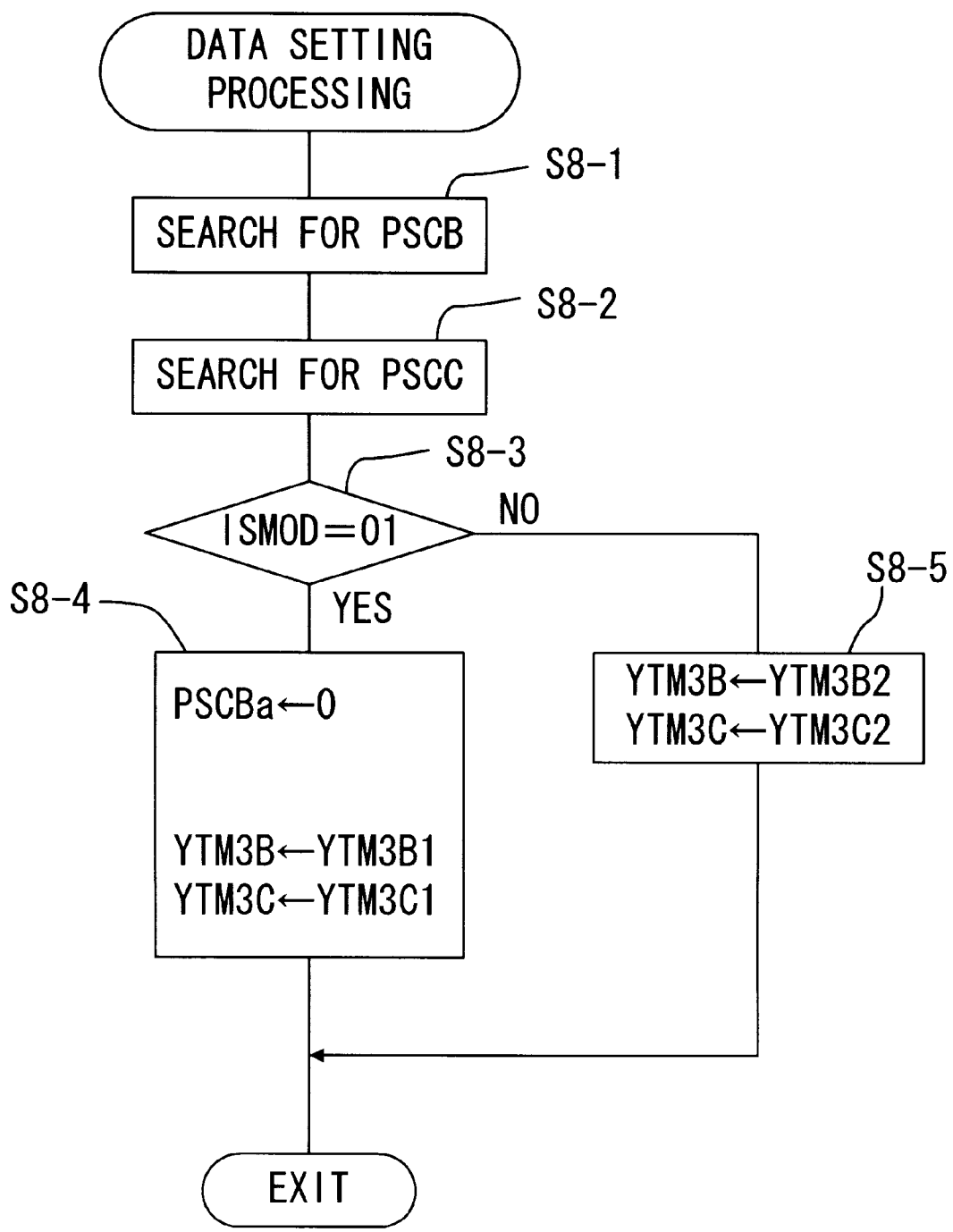
FIG. 5 is a flow chart showing the content of processing at step S8 of the control program in FIG. 3.

When the hydraulic oil pressure in the hydraulic circuit 11 rises and the flag F2 is set to "1", the program proceeds to step S8 to perform the data setting processing. Details of this data setting processing are shown in FIG. 5 and its detailed explanation will be made hereinbelow. At steps S8-1 and S8-2, an added value PSCB for the ineffective stroke eliminating pressure and an added value PSCC for the creeping pressure are respectively searched. PSCB and PSCC are set such that the lower the hydraulic oil temperature becomes, the higher they become, considering the delay in response to the increase in the hydraulic oil pressure. Values of PSCB and PSCC which correspond to the oil temperature at the present time are searched in the data table of PSCB and PSCC which has the oil temperature as a parameter.

Then, a discrimination is made at step S8-3 as to whether the step mode value ISMOD has been set to "01" or not. If ISMOD=01, the program proceeds to step S8-4. At step S8-4, a preliminarily added value PSCBa for the ineffective stroke eliminating pressure is re-written to zero. Further, a timer value YTM3B for judging the termination of the ineffective stroke eliminating pressure and a timer value YTM3C for judging the starting of the creeping pressure are set to first set values of YTM3B1 (e.g., 420 msec) and YTM3C1 (e.g., 400 msec), respectively. If ISMOD has been set to "02", the program proceeds to step S8-5, where YTM3B and YTM3C are set to second set values of YTM3B2 (e.g., 470 msec) and YTM3C2 (e.g., 450 msec), respectively.

With reference to FIG. 3, when the data setting processing has been finished at step S8 as described above, the program then proceeds to step S9. At step S9, a discrimination is made as to whether the remaining time TM3 in the third timer is above a predetermined set time YTM3A (e.g., 490 msec) or not, i.e., as to whether the time of lapse from the point of time of pressure rise is within YTM3–YTM3A or not. If a condition of TM3≧YTM3A is satisfied, the hydraulic oil pressure command value PSCCMD is set at step S10 to a value obtained by adding PSCB and PSCBa to PSCA. If a condition of TM3<YTM3A is satisfied, a discrimination is made at step S11 as to whether TM3 is above YTM3B or not, i.e., as to whether the time of lapse from the point of time of rise in the hydraulic oil pressure is within YTM3–YTM3B or not. If a condition of TM3≧YTM3B is satisfied, the hydraulic oil pressure command value PSCCMD is set at step S12 to a value obtained by adding PSCB to PSCA. If a condition of TM3<YTM3B is satisfied, a discrimination is made at step S13 as to whether TM3 is above YTM3C or not, i.e., as to whether the time of lapse from the point of time of rise in the hydraulic oil pressure is within YTM3–YTM3C or not. If a condition of TM3≧YTM3C is satisfied, the hydraulic oil pressure command value PSCCMD is set at step S14 to a value obtained by deducting, from a value obtained by adding PSCC to PSCA, that preliminarily deducted value PSCCa for the creeping pressure which is set in advance to a predetermined value. When a condition of TM3<YTM3C has been satisfied, the flag F1 is set at step S15 to "1" and also, at step S16, the hydraulic oil pressure command value PSCCMD is set to a value obtained by adding PSCC to PSCA. From the next time, a determination of "YES" is made at step S1 and the program thus proceeds to step S17. At step S17, a discrimination is made as to whether the remaining time TM1 in the first timer has become zero or not, i.e., as to whether the time of lapse from the point of time of setting the hydraulic oil pressure command value PSCCMD to PSCA+PSCC has become YTM1 or not. Then, when a condition of TM1=0 has been satisfied, a discrimination is made at step S18 as to whether or not the range of the transmission is "N" or "P." If the range is in a running range other than "N" and "P", a discrimination is made at step S19 as to whether the flag F9 has been set to "1" or not. Since the flag F9 has initially been set to "0", a determination of "NO" is made at step S19, and the program proceeds to step S20. At step S20, a discrimination is made as to whether the rotational speed NDR of the drive pulley 50 has exceeded a second predetermined speed YNDR2 or not. If TM1≠0, or if the range is "N" or "P", or if a condition of NDR<YNDR2 is satisfied, the remaining time TM4 in a subtraction type of fourth timer is set at step S21 to a predetermined time YTM4. The program then proceeds to step S16, where the hydraulic oil pressure command value PSCCMD is held at PSCA+PSCC.

Figure 8:
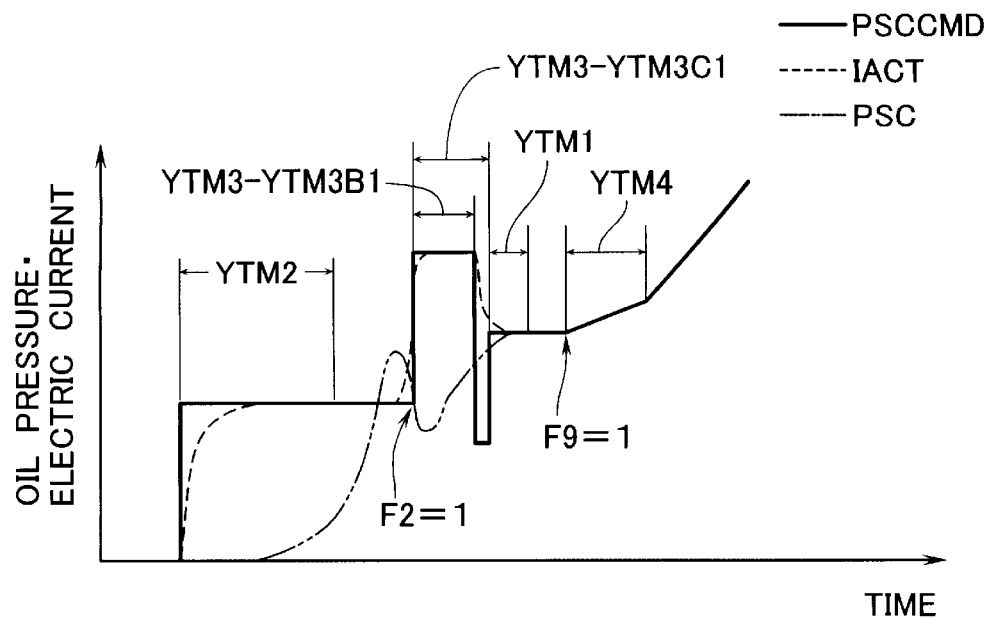
FIG. 8 is a time chart showing the changes in a hydraulic oil pressure command value PSCCMD, an effective electric current value IACT of a solenoid, and actual hydraulic oil pressure PSC in the starting clutch when the hydraulic circuit has no residual pressure.

Here, PSCC is set such that the value obtained by adding the initial value PSCA to PSCC becomes the creeping pressure. Further, PSCB is set to a value larger than PSCC. When ISMOD is set to "01" as a result of discrimination of the rise in the hydraulic oil pressure by the counter-electromotive force of the solenoid $15_{3a}$, PSCBa is re-written to zero as described hereinabove. Therefore, as shown in FIG. 8, until the time YTM3–YTM3B (=YTM3B1) has lapsed from the point of time of discrimination of the rise in the hydraulic oil pressure (i.e., the time when the condition of F2=1 has been satisfied), the hydraulic oil pressure command value PSCCMD is held at PSCA+PSCB, i.e., at the ineffective stroke eliminating pressure which is higher than the creeping pressure. During this period of time, an actual hydraulic oil pressure PSC in the starting clutch 7 increases at a good response toward the creeping pressure while minimizing the ineffective stroke. When the lapse of time from the point of time of discriminating the rise in the hydraulic oil pressure has exceeded YTM3–YTM3B, PSCCMD is switched to a value obtained by PSCA+PSCC–PSCCa, i.e., a value smaller than the creeping pressure, until the lapse of time becomes YTM3–YTM3C (=YTM3C1). When the lapse of time has exceeded YTM3–YTM3C, PSCCMD is switched to PSCA+PSCC, i.e., to the creeping pressure. In this manner, by temporarily making PSCCMD smaller than the creeping pressure when PSCCMD is switched from the ineffective stroke eliminating pressure to the creeping pressure, the effective electric current value IACT of the solenoid $15_{3a}$ lowers at a good response from the electric current value corresponding to the ineffective stroke eliminating pressure down to the electric current value corresponding to the creeping pressure. The actual clutch pressure PSC of the starting clutch 7 is then increased to the creeping pressure without giving rise to overshooting before the lapse of time YTM1 from the point of time at which PSCCMD was switched to the creeping pressure.

Figure 9:
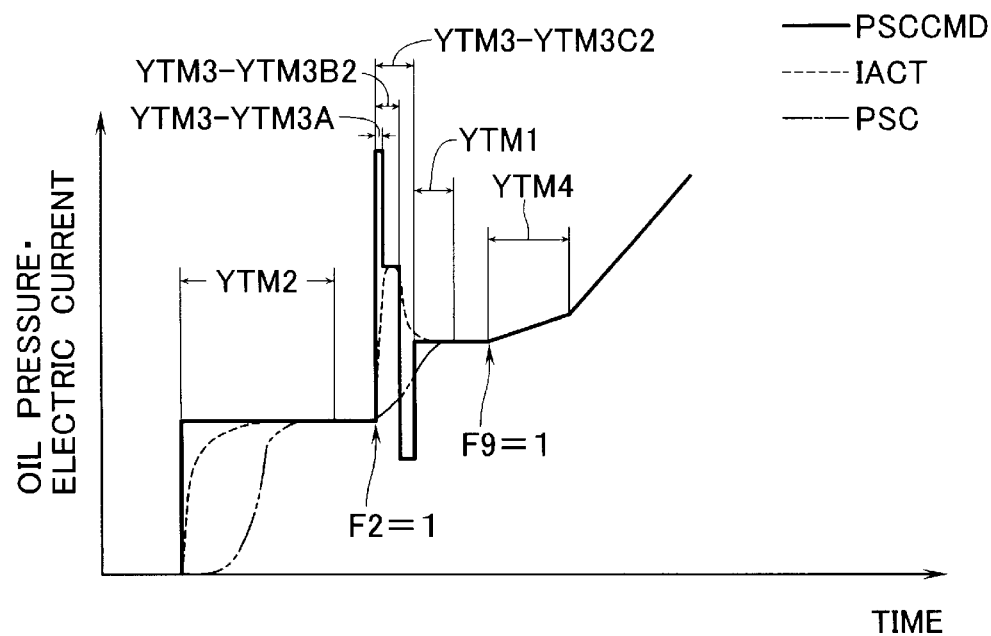
FIG. 9 is a time chart showing the changes in a hydraulic oil pressure command value PSCCMD, an effective electric current value IACT of a solenoid, and actual hydraulic oil pressure PSC in the starting clutch when the hydraulic circuit has a residual pressure.

When the rise in the hydraulic oil pressure is discriminated based on the rotational speed NDR of the drive pulley 50 and the rotational speed NE of the engine 1, and ISMOD is consequently set to "02", PSCCMD is switched, as shown in FIG. 9, to a value of PSCA+PSCB+PSCBa, i.e., to a value higher than the ineffective stroke eliminating pressure until the time of lapse from the point of time of discriminating the rise in the hydraulic oil pressure becomes YTM3–YTM3A. When the time of lapse has exceeded YTM3–YTM3A, PSCCMD is switched to PSCA+PSCB, i.e., the ineffective stroke eliminating pressure. In this manner, by temporarily making PSCCMD higher than the ineffective stroke eliminating pressure when PSCCMD is switched from the initial pressure PSCA to the ineffective stroke eliminating pressure, the effective electric current value IACT of the solenoid $15_{3a}$ increases at a good response from the electric current value corresponding to the initial pressure to the electric current value corresponding to the ineffective stroke eliminating pressure. When ISMOD is set to "01" the effective electric current value IACT has already increased by the counter-electromotive force. Therefore, it is not necessary to make PSCCMD higher than the ineffective stroke eliminating pressure for the purpose of improving the response of IACT. When the lapse of time from the time of discriminating the rise in the hydraulic oil pressure has exceeded YTM3−YTM3B (=YTM3B2), PSCCMD is switched to PSCA+PSCC−PSCCa, i.e., a value smaller than the creeping pressure until the lapse of time becomes YTM3−YTM3C (=YTM3C2). Thereafter, PSCCMD is switched to PSCA+PSCC, i.e., the creeping pressure. Here, it is when there is a residual pressure in the hydraulic circuit 11 that ISMOD is set to "02". Since the actual hydraulic oil pressure PSC of the starting clutch 7 increases at a relatively good response, YTM3B2 is set to a value larger than YTM3B1 to thereby shorten the time to hold PSCCMD at the ineffective stroke eliminating pressure.

Until the forward/reverse switching mechanism 6 becomes the in-gear state, PSCCMD is held at the creeping pressure. The engaging force of the starting clutch 7 is thus kept below the creeping force at which the creeping of the vehicle occurs to thereby prevent the occurrence of shocks by a sudden rise in the driving torque of the driving wheels of the vehicle at the time of gearing in. Here, whether the forward/reverse switching mechanism 6 has become the in-gear state or not can be discriminated by checking whether the deviation between the rotational speed NE of the engine 1 and the rotational speed NDR of the drive pulley 50 has fallen below a predetermined value or not. However, at the time of vehicle start-up from the state of engine stopping, the rotational speed of the engine 1 rapidly increases. Therefore, if the rotational speed of the engine 1 is calculated from the difference in times of inputting of the ignition pulses as described hereinabove, the calculated NE becomes considerably smaller than the actual NE and, as a result, the judgement of the in-gear state is delayed. Therefore, in this embodiment, the discrimination of the in-gear state is made based only on the rotational speed NDR of the drive pulley 50. In other words, as described above, a discrimination is made at step S20 as to whether the rotational speed NDR of the drive pulley 50 has exceeded a predetermined second speed YNDR2 (e.g., 700 rpm) or not. When a condition of NDR≧YNDR2 has been satisfied, it is judged that the forward/reverse switching mechanism 6 has become the in-gear state and, at step S22, the flag F9 is set to "1." The program then proceeds to step S23 and the following steps. The control mode of the starting clutch 7 is then switched from the previous waiting mode to the running mode.

In the running mode, first, an ordinary hydraulic oil pressure PSCN of the starting clutch 7 corresponding to the rotational speed NE of the engine 1 is calculated at step S23. Then, at step S24, a discrimination is made as to whether PSCN is above a limit value PSCLMT for annealing or not. If PSCN≧PSCLMT, a discrimination is made at step S25 as to whether the remaining time TM4 in the fourth timer is zero or not, i.e., as to whether the time of lapse from the point of time of the in-gear discrimination (=point of time when a state of F9=1 has been satisfied) has exceeded YTM4 or not. If TM4=0, a change limit value ΔPLMT on the positive (plus) side of the hydraulic oil pressure per one time is set at step S26 to an ordinary annealing value YAPLMTN (e.g., 0.5 kg/cm²). If TM4≠0, ΔPLMT is set at step S27 to a value YΔPLMTS (e.g., 0.25 kg/cm²) which is smaller than YΔPLMTN. Then, at step S28, a discrimination is made as to whether an absolute value of the deviation between PSCN and PSCLMT is above ΔPLMT or not. If the deviation is above ΔPLMT, PSCLMT is re-written at step S29 to a value which is obtained by adding APLMT to the preceding value of PSCLMT. If the deviation is below ΔPLMT, PSCLMT is re-written at step S30 to PSCN. Further, if a condition of PSCN<PSCLMT is satisfied, a discrimination is made at step S31 as to whether or not an absolute value of the deviation between PSCN and PSCLMT is above a predetermined upper limit value ΔPLMTM on the negative (minus) side (e.g., 0.5 kg/cm²) of the hydraulic oil pressure. If the deviation is above ΔPLMTM, PSCLMT is re-written at step S32 to a value which is obtained by deducting APLMTM from the preceding value of PSCLMT. If the deviation is below ΔPLMTM, PSCLMT is re-written at step S30 to PSCN as described hereinabove. In addition, at step S33, the hydraulic oil pressure command value PSCCMD is set to PSCLMT.

In this manner, when YTM4 has lapsed from the point of time of the discrimination of the in-gear state, the amount of increase (or increment) per time of the hydraulic oil pressure command value PSCCMD becomes the ordinary annealing value YΔPLMTN. However, until YTM4 has lapsed, the amount of increment per time of PSCCMD is limited to YΔPLMS which is smaller than the ordinary annealing value. PSCCMD, i.e., the speed of increase in the engaging force of the starting clutch 7 is limited to a relatively low speed.

In order to improve the durability of, and to reduce the friction loss of, the belt 52, the pulley side-pressure shall not be made larger than is required as compared with the transmission torque at the point of time in question. Therefore, in the waiting mode, the pulley side-pressure is made relatively low and, as a result of switching to the running mode, the pulley side-pressure is increased to suit the increase in the engaging force of the starting clutch 7 above the creeping force. However, there are cases where the hydraulic oil pressure in the hydraulic circuit 11 has not been completely increased to the line pressure even at the time of switching to the running mode. If the speed of increasing the engaging force of the starting clutch 7 is accelerated, the increase in the pulley side-pressure is delayed and, as a result, there is a possibility that the belt 52 gives rise to slipping. In order to suit this kind of time which may give rise to the delay in the increase in the pulley side-pressure, the above-described YTM4 is set to 90 msec, for example. By keeping low the increasing speed of the engaging force of the starting clutch 7 during this period of time, the slipping of the belt 52 can be prevented.

An explanation has so far been made about an embodiment in which the starting clutch 7 was constituted by a hydraulic clutch. The present invention can, however, be applicable to an embodiment in which the starting clutch 7 is constituted by a clutch such as an electromagnetic clutch, or the like, instead of a hydraulic clutch.

It is readily apparent that the above-described apparatus for controlling a starting clutch of a vehicle having a function of stopping engine idling meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for controlling a starting clutch of a vehicle having a function of stopping engine idling so that an engine is automatically stopped under given conditions when the vehicle is at a standstill, said starting clutch being provided in a transmission of the vehicle in series with a belt type continuously variable transmission mechanism, said apparatus comprising:

engagement preventing means for preventing an engaging force of the starting clutch from increasing above a creeping force which gives rise to creeping of the vehicle, said preventing being made at an initial time of vehicle start-up from the state of engine stopping until after a lapse of a predetermined time.

2. An apparatus for controlling a starting clutch of a vehicle having a function of stopping engine idling so that an engine is automatically stopped under given conditions when the vehicle is at a standstill, said starting clutch being provided in a transmission of the vehicle in series with a belt type continuously variable transmission mechanism, said apparatus comprising:

increase limiting means for limiting a speed of increase in an engaging force of the starting clutch, said limiting being made, until after a lapse of a predetermined time in a step in which the engaging force is increased above a creeping force which gives rise to creeping of the vehicle at a time of vehicle start-up from a state of engine stopping, by keeping an upper limit value of the speed of increase in the engaging force below a value after the lapse of the predetermined time.

3. An apparatus for controlling a starting clutch of a vehicle having a function of stopping engine idling so that an engine is automatically stopped under given conditions when the vehicle is at a standstill, said starting clutch being provided in a transmission of the vehicle in series with a belt type continuously variable transmission mechanism which receives an input of a power from the engine through power transmission mechanism having built therein hydraulically operated frictional engaging elements, wherein, at a time of vehicle start-up from a state of engine stopping, a control mode of the starting clutch is switched from a waiting mode in which an engaging force of the starting clutch is kept below a creeping force which gives rise to creeping of the vehicle to a running mode in which the engaging force of the starting clutch is increased above the creeping force, said switching being made at a time when the power transmission mechanism has become an in-gear state in which the power is transmitted, said apparatus comprising:

increase limiting means for limiting a speed of increase in the engaging force, said limiting being made, until after a lapse of a predetermined time from a point of time of switching to the running mode, by keeping an upper limit value of the speed of increase in the engaging force below a value after the lapse of the predetermined time.

* * * * *